UNITED STATES PATENT OFFICE.

CARL BOSCH, OF LUDWIGSHAFEN-ON-THE-RHINE, GERMANY, ASSIGNOR, BY MESNE ASSIGNMENTS, TO THE CHEMICAL FOUNDATION, INC., A CORPORATION OF DELAWARE.

COMPOUND OF UREA.

1,369,383. Specification of Letters Patent. Patented Feb. 22, 1921.

No Drawing. Application filed April 27, 1916. Serial No. 93,882.

*To all whom it may concern:*

Be it known that I, CARL BOSCH, citizen of the German Empire, residing at Ludwigshafen-on-the-Rhine, Germany, have invented new and useful Improvements in Compound of Urea, of which the following is a specification.

The object of the present invention is a new compound of urea, consisting of a double compound of urea with calcium nitrate which contains four molecular proportions of urea to each molecular proportion of calcium nitrate and corresponds to the formula $Ca(NO_3)_2 + 4CO(NH_2)_2$.

This new compound can easily be obtained by mixing said constituents in the required proportions in the presence of a small quantity of water and then drying, or by adding to a concentrated hot solution of calcium nitrate, or to a melt of a hydrate of this salt, suitable proportions of urea and allowing this mixture to crystallize; the new double compound separates out, forming well-shaped crystals. Long exposure of the salt or solutions thereof to a high temperature should, however be avoided, say to boiling point or even lower, since otherwise decomposition takes place with precipitation of calcium carbonate. The new compound is easily soluble in water and does not show the unpleasant property of calcium nitrate of liquefying if exposed to the air. Therefore it can be manipulated without difficulty and in particular is excellently fit for use as a fertilizer. For the last named use any other desired admixture can be added.

Now what I claim is:

1. As a new article of manufacture, the new compound of urea containing four molecular proportions of urea to each molecular proportion of calcium nitrate.

2. The process of producing a compound of urea comprising mixing urea with calcium nitrate in the proportions of four molecular proportions of the former to each molecular proportion of the latter and in the presence of a small quantity of water and then drying.

3. The process of obtaining a new compound of urea which comprises mixing urea with calcium nitrate in the proportion of four molecular proportions of urea to each malecular proportion of calcium nitrate, the latter in a concentrated hot solution.

4. The process of producing a compound or urea which comprises adding the urea to a melt of a hydrate of calcium nitrate in the proportion of four molecular proportions of urea to each molecular proportion of calcium nitrate and allowing the mixture to crystalize.

In testimony whereof I have hereunto set my hand in the presence of two subscribing witnesses.

CARL BOSCH.

Witnesses:
ARTHUR DENONVILLE,
C. TURNER BROWN.